(12) United States Patent
Barber (10) Patent No.: US 11,470,788 B2
(45) Date of Patent: Oct. 18, 2022

(54) SUMP PUMP IRRIGATION ASSEMBLY

(71) Applicant: Lawrence Barber, Ellicott City, MD (US)

(72) Inventor: Lawrence Barber, Ellicott City, MD (US)

(*) Notice: Subject to any disclaimer, the term of this patent is extended or adjusted under 35 U.S.C. 154(b) by 216 days.

(21) Appl. No.: 16/870,213

(22) Filed: May 8, 2020

(65) Prior Publication Data
US 2021/0345563 A1 Nov. 11, 2021

(51) Int. Cl.
| | | |
|---|---|---|
| *A01G 25/02* | (2006.01) | |
| *E04D 13/08* | (2006.01) | |
| *F04D 29/40* | (2006.01) | |
| *E03B 5/02* | (2006.01) | |
| *B05B 1/20* | (2006.01) | |

(52) U.S. Cl.
CPC .............. *A01G 25/02* (2013.01); *E03B 5/02* (2013.01); *E04D 13/08* (2013.01); *F04D 29/406* (2013.01); *B05B 1/20* (2013.01); *E04D 2013/0813* (2013.01)

(58) Field of Classification Search
CPC ..... A01G 25/02–06; E03B 5/02; E04D 13/08; E04D 2013/0806; E04D 2013/0813; B05B 1/20; B05B 1/205; F04D 29/406
USPC .......................................................... 239/1
See application file for complete search history.

(56) References Cited

U.S. PATENT DOCUMENTS

| | | | |
|---|---|---|---|
| 41,762 A | 3/1864 | Degel | |
| 3,857,730 A | 12/1974 | Kalafus | |
| 4,221,501 A * | 9/1980 | Saburi | A01G 25/06 405/36 |
| 5,129,758 A * | 7/1992 | Lindstrom | A01G 25/06 239/533.13 |
| 5,297,896 A | 3/1994 | Webb | |
| 5,927,762 A | 7/1999 | Webb | |
| 7,207,748 B1 | 4/2007 | Urban | |
| 7,614,192 B2 | 11/2009 | Safie | |
| 8,979,431 B2 * | 3/2015 | Bayley | A01G 25/06 405/37 |
| D741,815 S | 10/2015 | Cummings | |
| 10,472,830 B1 * | 11/2019 | Middleton | E03B 3/02 |
| 2011/0114748 A1 | 5/2011 | Boyajian | |
| 2013/0074400 A1 * | 3/2013 | Roess | A01G 25/06 47/21.1 |
| 2014/0259965 A1 * | 9/2014 | Marawi | C09K 17/08 52/741.11 |

* cited by examiner

*Primary Examiner* — Tuongminh N Pham
*Assistant Examiner* — Juan C Barrera (57) ABSTRACT

A sump pump irrigation assembly for reducing water erosion from a sump pump outlet includes a plurality of fluid fittings. A respective one of the fluid fittings is fluidly coupled to an outlet of a sump pump to receive water from the outlet. A supply pipe is fluidly coupled to the fluid fitting that is fluidly coupled to the outlet to receive the water from the fluid fitting. A plurality of drainage pipes is each of the drainage pipes is in fluid communication with the supply pipe to receive the water from the supply pipe. Each of the drainage pipes has a plurality of holes therein to release the water outwardly therefrom. A plurality of cleanout fittings is each fluidly coupled between a respective pair of the drainage pipes. Each of the cleanout fittings has an access port to facilitate debris to be removed from the cleanout fittings.

10 Claims, 9 Drawing Sheets

SUMP PUMP IRRIGATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

The disclosure relates to irrigation devices and more particularly pertains to a new irrigation device for reducing water erosion from a sump pump outlet.

(2) Description of Related Art including information disclosed under 37 CFR 1.97 and 1.98.

The prior art relates to irrigation devices.

The disclosure and prior art relates to irrigation devices and more particularly pertains to a new irrigation device for reducing water erosion from a sump pump outlet.

BRIEF SUMMARY OF THE INVENTION

An embodiment of the disclosure meets the needs presented above by generally comprising a plurality of fluid fittings. A respective one of the fluid fittings is fluidly coupled to an outlet of a sump pump to receive water from the outlet. A supply pipe is fluidly coupled to the fluid fitting that is fluidly coupled to the outlet to receive the water from the fluid fitting. A plurality of drainage pipes is each of the drainage pipes is in fluid communication with the supply pipe to receive the water from the supply pipe. Each of the drainage pipes has a plurality of holes therein to release the water outwardly therefrom. A plurality of cleanout fittings is each fluidly coupled between a respective pair of the drainage pipes. Each of the cleanout fittings has an access port to facilitate debris to be removed from the cleanout fittings.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
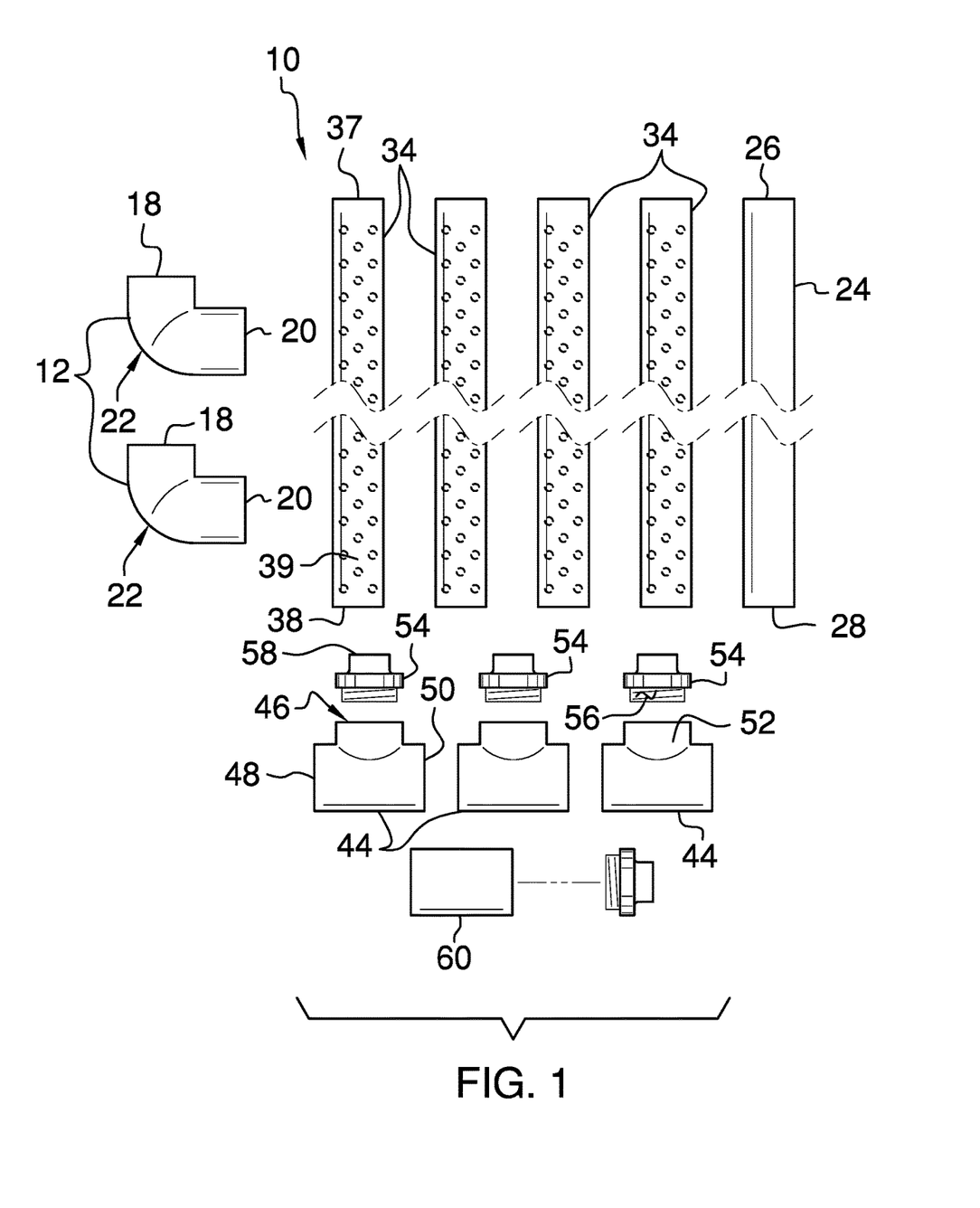
FIG. 1 is a kit view of a sump pump irrigation assembly according to an embodiment of the disclosure.
Figure 2:
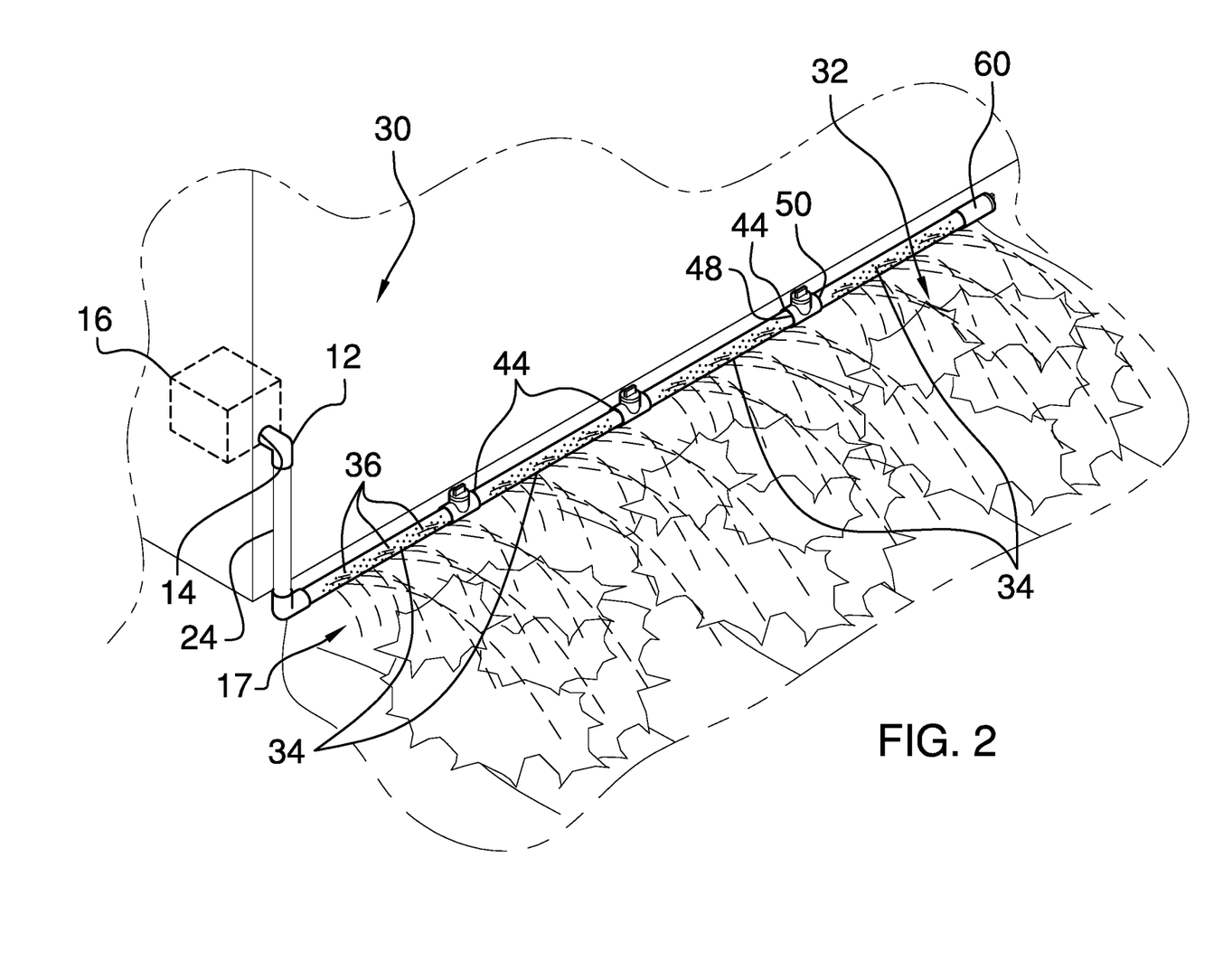
FIG. 2 is a perspective in-use view of an embodiment of the disclosure.
Figure 3:
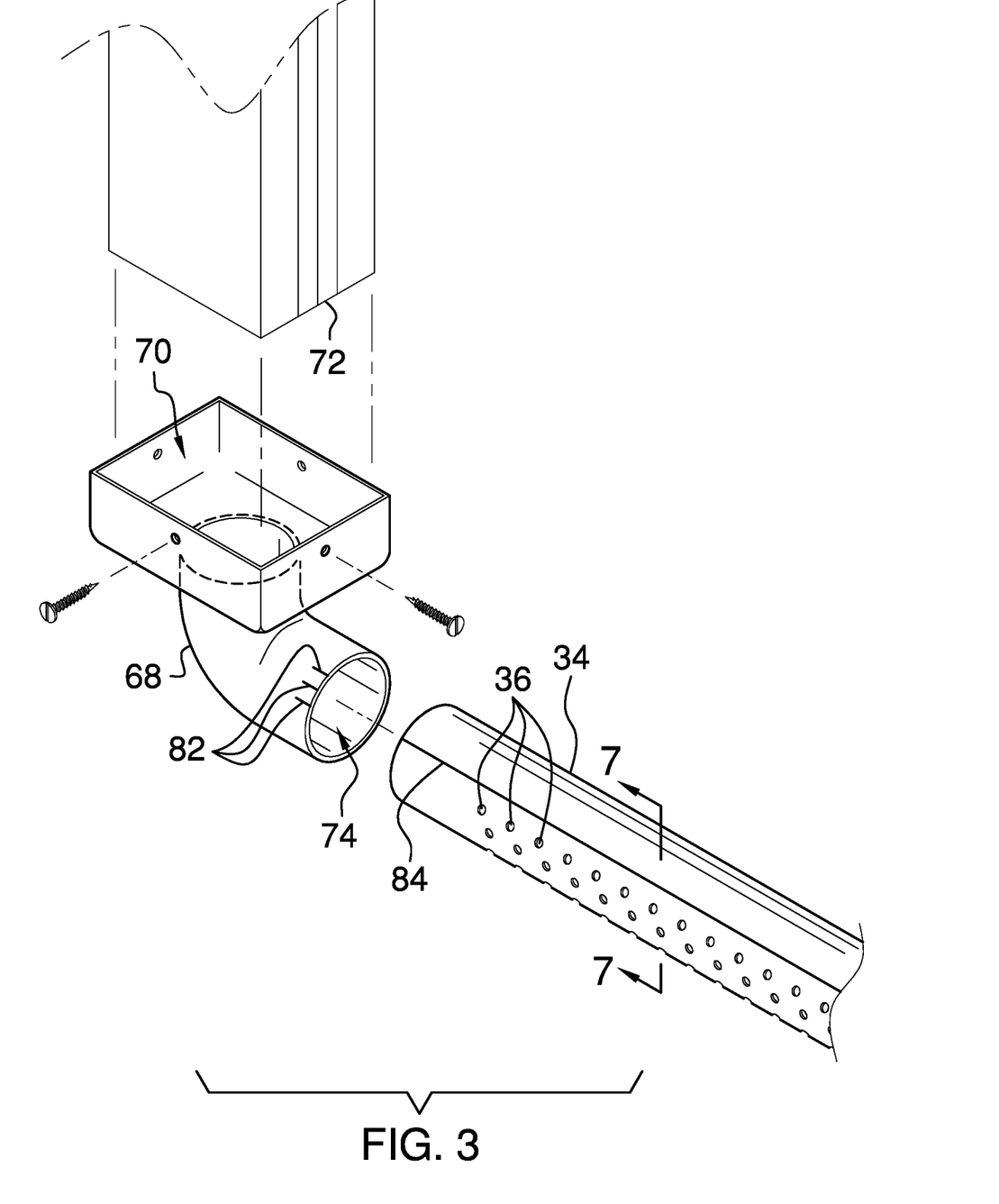
FIG. 3 is an exploded perspective view of an alternative embodiment of the disclosure.
Figure 4:
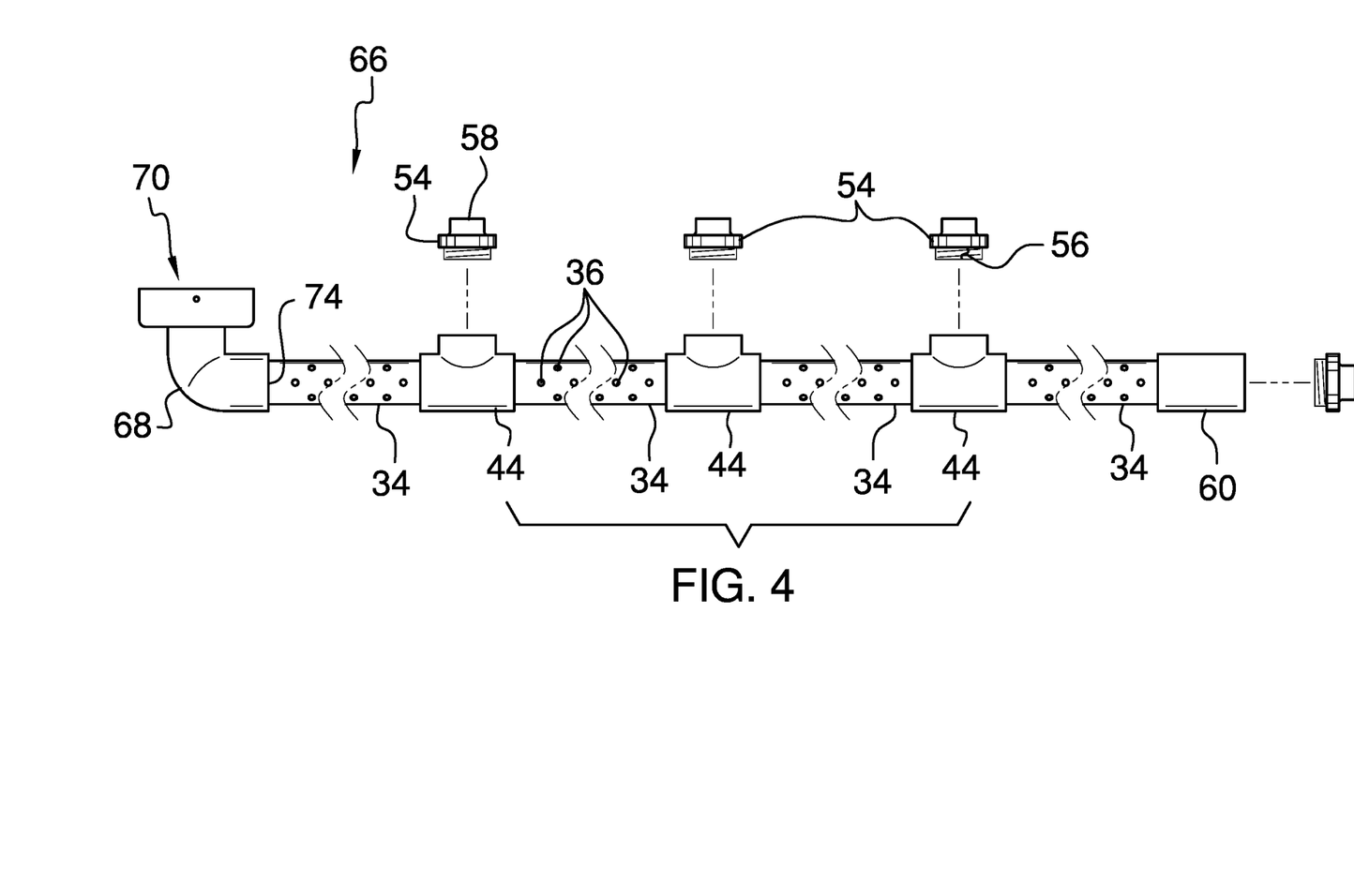
FIG. 4 is a perspective view of an alternative embodiment of the disclosure.
Figure 5:
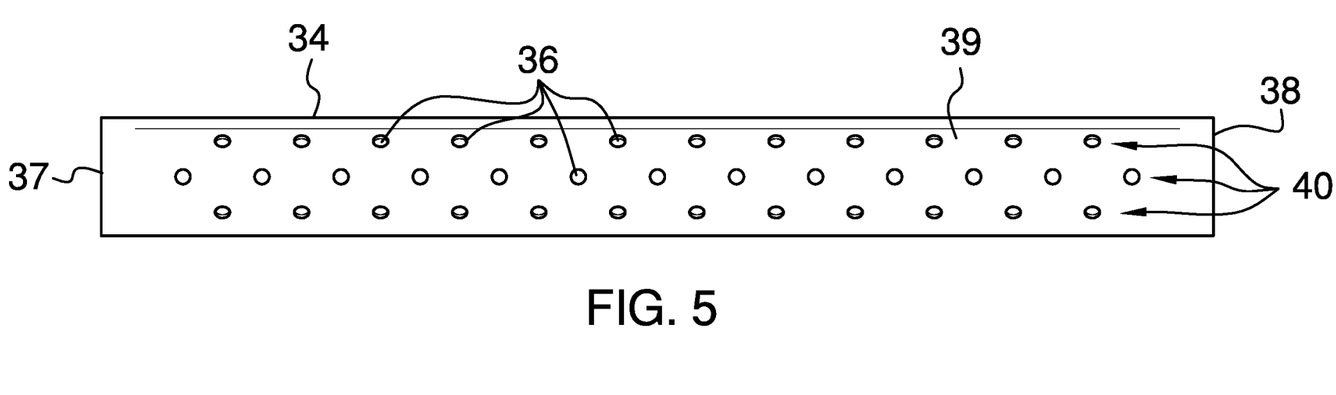
FIG. 5 is a front view of a drainage pipe of an embodiment of the disclosure.
Figure 6:
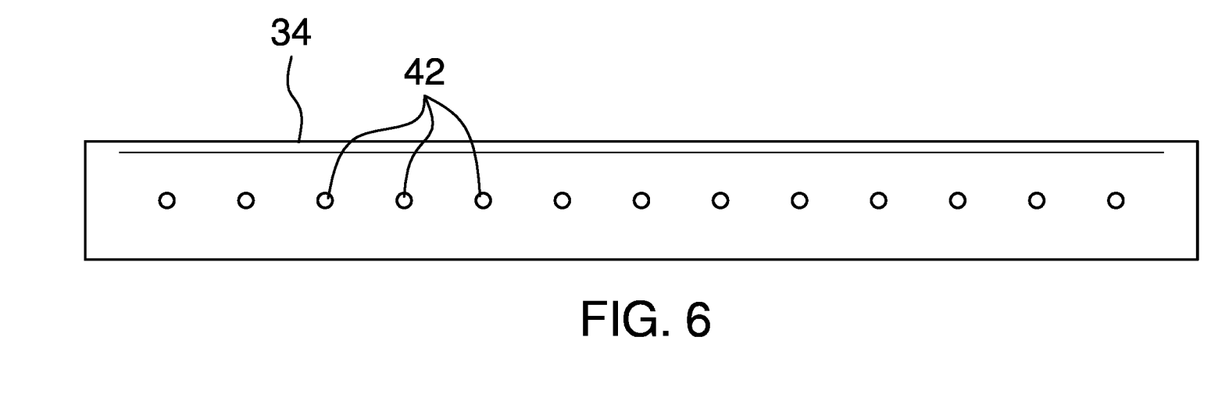
FIG. 6 is a bottom view of a drainage pipe of an embodiment of the disclosure.
Figure 7:
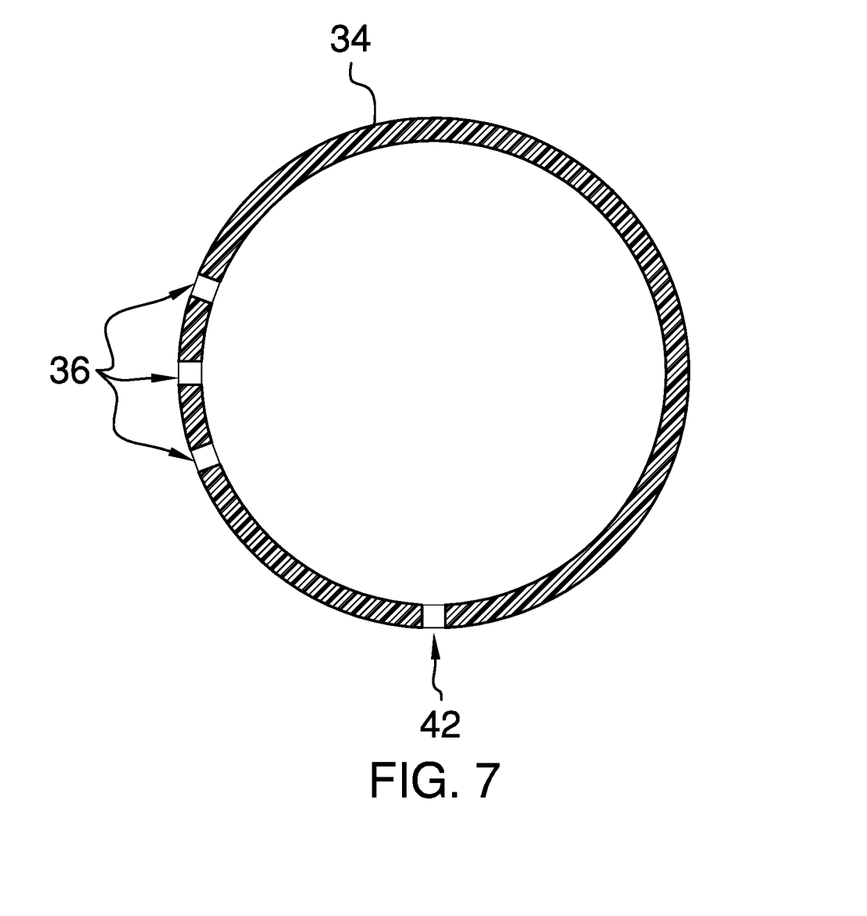
FIG. 7 is a cross sectional view taken along line 7-7 of FIG. 3 of an embodiment of the disclosure.
Figure 8:
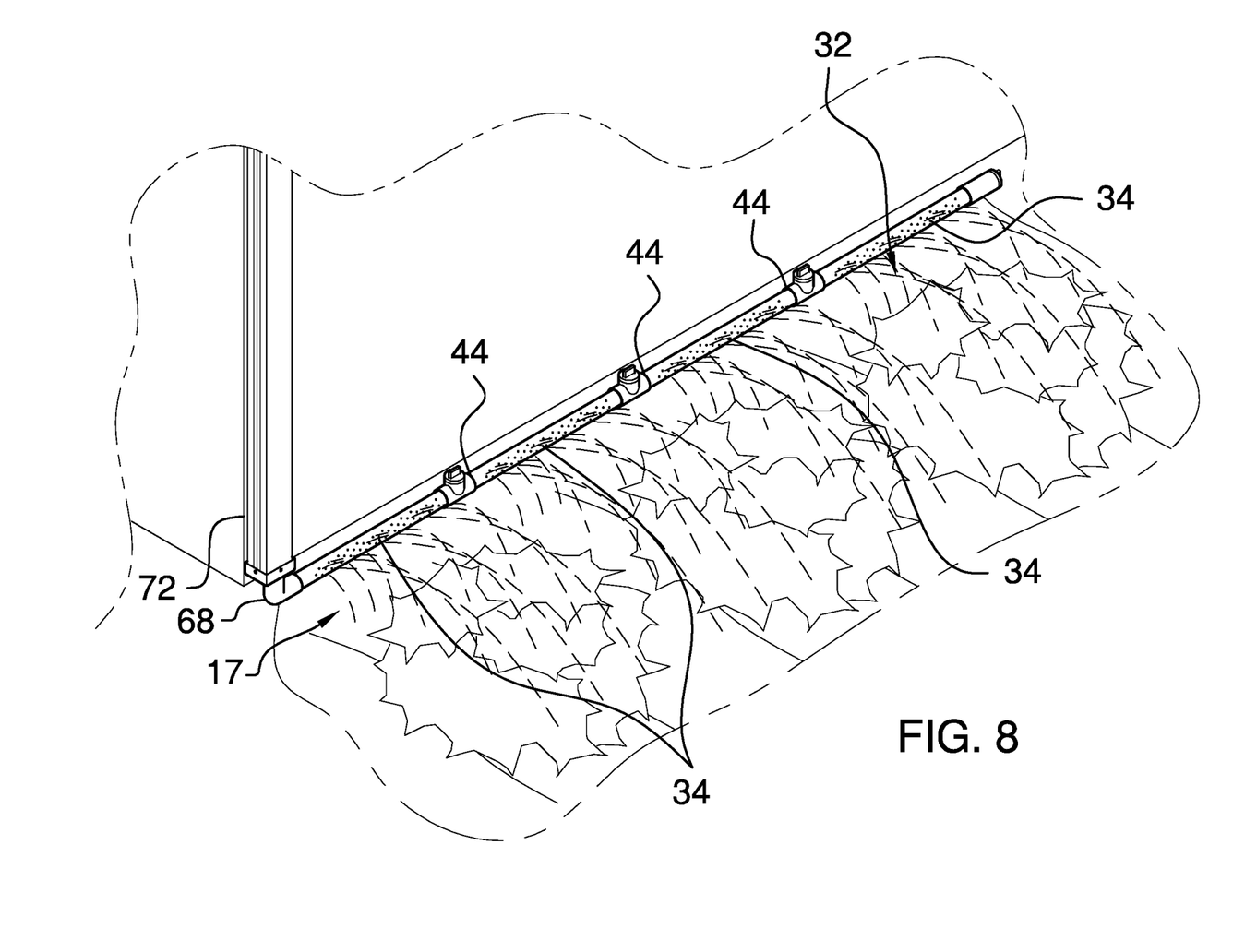
FIG. 8 is a perspective in-use view of an embodiment of the disclosure showing a receiver coupled to a downspout.
Figure 9:
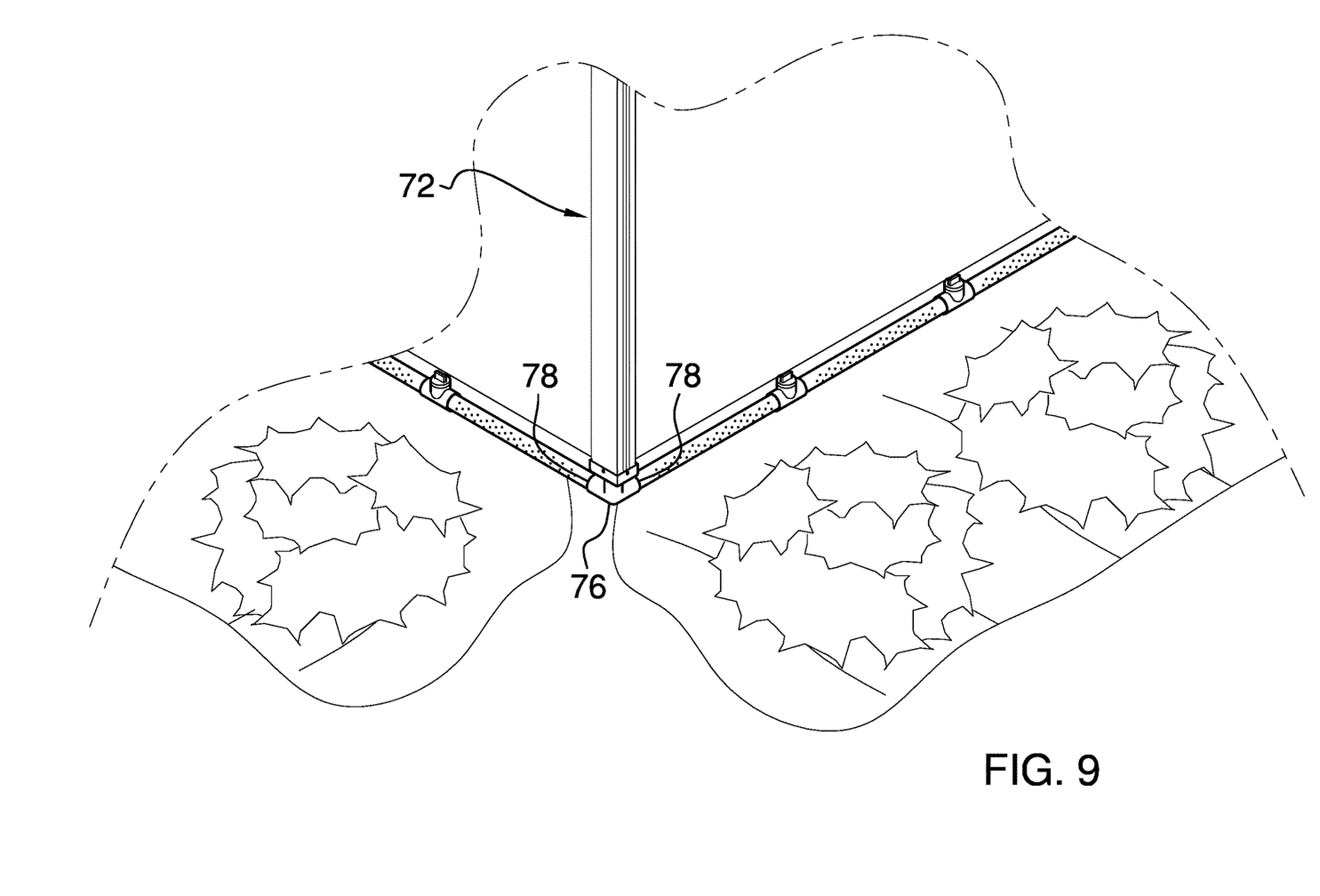
FIG. 9 is a perspective in-use view of an embodiment of the disclosure showing a twin output receiver fluidly coupled to a downspout.
Figure 10:
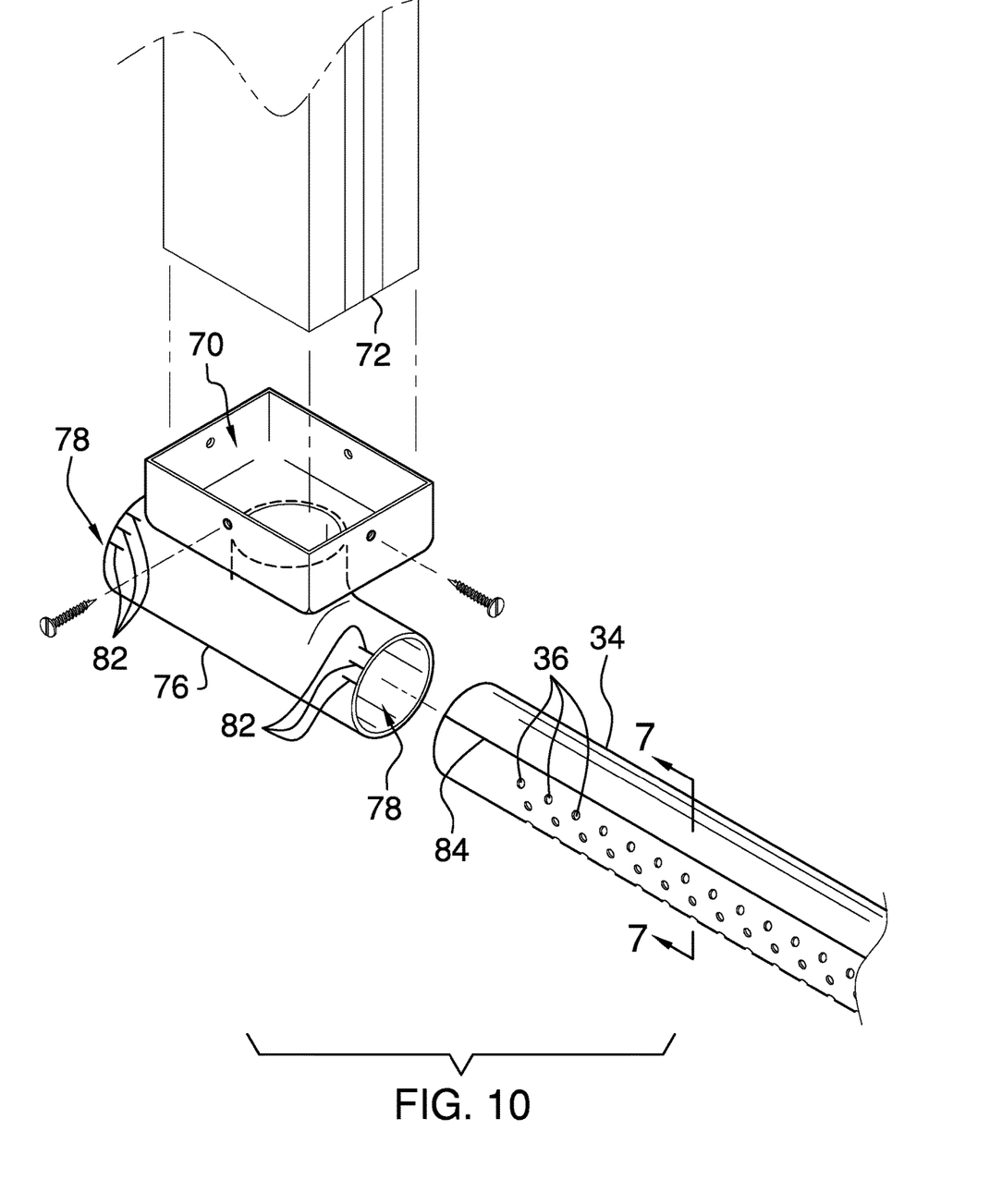
FIG. 10 is an exploded perspective view showing a twin output receiver.

With reference now to the drawings, and in particular to FIGS. 1 through 10 thereof, a new irrigation device embodying the principles and concepts of an embodiment of the disclosure and generally designated by the reference numeral 10 will be described.

As best illustrated in FIGS. 1 through 10, the sump pump irrigation assembly 10 generally comprises a plurality of fluid fittings 12. A respective one of the fluid fittings 12 is fluidly coupled to an outlet 14 of a sump pump 16 to receive water 17 from the outlet 14. Each of the fluid fittings 12 has a first end 18 and a second end 20. Moreover, each of the fluid fittings 12 has a bend 22 that is centrally positioned between the first 18 and second 20 ends such that each of the fluid fittings 12 forms an elbow. The first end 18 of the respective fluid fitting 12 is fluidly coupled to the outlet 14. The sump pump 16 may be a residential sump pump in house or the like.

A supply pipe 24 is fluidly coupled to the fluid fitting 12 that is fluidly coupled to the outlet 14 such that the supply pipe 24 receives the water 17 from the fluid fitting 12 The supply pipe 24 has a primary end 26 and a secondary end 28, and the supply pipe 24 is elongated between the primary 26 and secondary 28 ends. The second end 20 of the respective fluid fitting 12 insertably receives the primary end 26 of the supply pipe 24. In this way the supply pipe 24 extends downwardly along a wall 30 of a building through which the outlet 14 of the sump pump 16 protrudes. The secondary end 28 of the supply pipe 24 has one of the fluid fittings 12 being associated therewith. The first end 18 of the associated fluid fitting 12 insertably receives the secondary end 28 of the supply pipe 24 such that the associated fluid fitting 12 is aligned with the ground 32.

A plurality of drainage pipes 34 is provided and each of the drainage pipes 34 is in fluid communication with the supply pipe 24 to receive the water 17 from the supply pipe 24. Each of the drainage pipes 34 has a plurality of holes 36 therein to release the water 17 outwardly therefrom. In this way the water 17 can be distributed over a large area for reducing erosion on the ground 32 as compared to discharging the water 17 from the outlet 14 of the sump pump 16. Each of the drainage pipes 34 has a first end 37, a second end 38 and an outer wall 39 extending therebetween. The outer wall 39 of each of the drainage pipes 34 has the holes 36 extending into an interior of the drainage pipes 34. Additionally, the drainage pipes may have a length ranging between approximately 36.0 inches and 48.0 inches.

The holes 36 on a respective one of the drainage pipes 34 are distributed between the first 37 and second 38 ends of the respective drainage pipe 34. The holes 36 on each of the drainage pipes 34 are arranged into a plurality of rows 40 on the drainage pipes 34. Moreover, the holes 36 on each of the drainage pipes 34 are directed laterally away from the drainage pipe 34 to direct the water 17 outwardly from the drainage pipes 34. In this way the water 17 from the sump pump 16 can be distributed for irrigating plants on the ground 32 when the sump pump 16 is pumping the water 17.

Each of the drainage pipes 34 has a plurality of drain apertures 42 each extending into the interior of the drainage pipes 34. The drain apertures 42 on a respective one of the drainage pipes 34 are distributed between the first 37 and second 38 ends of the respective drainage pipe 34. The drain apertures 42 on the respective drainage pipe are offset from the holes 36 on the respective drainage pipe. Each of the drain apertures 42 on the respective drainage pipe is directed downwardly to drain residual water 17 from the drainage pipes 34 when the sump pump 16 is not pumping the water 17.

A plurality of cleanout fittings 44 is provided and each of the cleanout fittings 44 is fluidly coupled between a respective pair of the drainage pipes 34. In this way each of the drainage pipes 34 is in fluid communication with each other. Additionally the plurality of drainage pipes 34 can be coupled together to extend along a full length of flower bed, a row of shrubs or any other elongated landscaping feature that can benefit from irrigation. Each of the cleanout fittings 44 has an access port 46 that is oriented perpendicular with the drainage pipes 34 for accessing an interior of the cleanout fittings 44 when the cleanout fittings 44 are coupled to the drainage pipes 34. In this way the access port 46 on each of the cleanout fittings 44 facilitates debris, such as leaves and dirt or the like, to be removed from the cleanout fittings 44.

Each of the cleanout fittings 44 has a primary end 48 and a secondary end 50, and the access port 46 on each of the cleanout fittings 44 is centrally positioned between the primary 48 and secondary 50 ends. Moreover, the access port 46 on each of the cleanout fittings 44 is oriented to extend along a line that is perpendicular to a line extending through the primary 48 and secondary 50 ends of the cleanout fittings 44. The access port 46 on each of the cleanout fittings 44 has a bounding surface 52.

A plurality of caps 54 is provided and each of the caps 54 is positionable in the access port 46 of a respective one of the cleanout fittings 44 to close the access port 46 on the respective cleanout fitting 44. Each of the caps 54 has an outer surface 56 and the outer surface 56 of each of the caps 54 is threaded. The outer surface 56 of each of the caps 54 threadably engages the bounding surface 52 of the access port 46 on the respective cleanout fitting 44. Additionally, each of the caps 54 may include a grip 58 that extends upwardly from the cap 54 for enhancing tightening or loosening the caps 54.

An end cap 60 is coupled to a respective one of the drainage pipes 34 that is distally positioned to the supply pipe 24 for closing the respective drainage pipe 34. The end cap 60 has a first end 62 and a second end 64, and the first end 62 of the end cap 60 insertably receives the secondary end 38 of the respective drainage pipe 34. As is most clearly shown in FIGS. 3 and 8, a receiver 68 is provided that has a rectangular entry port 70. The rectangular entry port 70 can insertably receive a downspout 72 of a gutter for receiving water 17 from the downspout 72. In this way water erosion is inhibited around the building and water buildup around the building is inhibited. The receiver 68 has an outlet 74 and the outlet 74 of the receiver 68 insertably receives the primary end 26 of the supply pipe 24 to receive the water 17 from the downspout 72. The outlet 74 on the receiver 68 is oriented to extend along a line that is oriented perpendicular to a longitudinal axis of the receiver 68. As is most clearly shown in FIG. 9, a twin output receiver 76 is provided that has a pair of outlets 78 which are oriented perpendicular to each other. In this way each of the outlets 78 on the twin output receiver 76 can direct the water 17 to flow each direction around a corner 80 of the building. As is most clearly shown in FIG. 10, the pair of outlets 78 on the twin output receiver 76 are oriented collinear with each other.

The receiver 68 has a plurality of alignment lines 82 printed thereon and each of the alignment lines 82 is positioned adjacent to the outlet 74. Additionally, each of the drainage pipes 34 has a reference line 84 being printed thereon that extends along a full length of the drainage pipes 34. The reference line 84 can be aligned with a chosen one of the alignment lines 82 on the receiver 68 for orienting the holes 36 in the drainage pipes 34 to direct the water at a 20.0 degree angle, a 10.0 degree angle or a 0.0 degree angle with respect to a horizontal plane. The twin output receiver 76 also has the alignment lines 82 printed thereon adjacent to each of the outlets 78 on the twin output receiver 76.

In use, the respective fluid fitting 12 is fluidly coupled to the outlet 14 of the sump pump 16 and the supply pipe 24 is fluid coupled to the respective fluid fitting 12. Each of the drainage pipes 34 are coupled together with the cleanout fittings 44 and a respective one of the drainage pipes 34 is coupled to the fluid fitting 12 on the secondary end 28 of the supply pipe 24. In this way each of the drainage pipes 34 receives the water 17 from the sump pump 16 when the sump pump 16 is turned on. Moreover, the water 17 is released from the drainage pipes 34 over the entire length of the drainage pipes 34. In this way water erosion is reduced from the discharge of water 17 from the sump pump 16 and the water 17 from the sump pump 16 is additionally appropriated for irrigation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sump pump irrigation assembly being configured to distribute water discharged from a sump pump over an area for reducing water erosion from the sump pump, said assembly comprising:
    a plurality of fluid fittings, a respective one of said fluid fittings being fluidly coupled to an outlet of a sump pump wherein said respective fluid fitting is configured to receive water from the outlet;
    a supply pipe being fluidly coupled to said fluid fitting that is fluidly coupled to the outlet wherein said supply pipe is configured to receive the water from said fluid fitting;
    a plurality of drainage pipes, each of said drainage pipes being in fluid. communication with said supply pipe wherein each of said drainage pipes is configured to receive the water from said supply pipe, each of said drainage pipes having a plurality of holes therein wherein each of said holes in each of said drainage pipes is configured to release the water outwardly therefrom thereby facilitating the water to be distributed over a large area for reducing erosion on the ground; and
    a plurality of cleanout fittings, each of said cleanout fittings being fluidly coupled between a respective pair of said drainage pipes such that the respective pair of drainage pipes are linearly aligned thereby placing each of said drainage pipes in fluid communication with each other, each of said cleanout fittings having an access port being oriented perpendicular with said drainage pipes for accessing an interior of said cleanout fittings when said cleanout fittings are coupled to said drainage pipes wherein said access port on each of said cleanout fittings is configured to facilitate debris to be removed from said cleanout fittings.

2. The assembly according to claim 1, wherein each of said fluid fittings has a first end and a second end, each of said fluid fittings haying a bend being centrally positioned between said first and second ends such that each of said fluid fittings forms an elbow, said first end of said respective fluid fitting being fluidly coupled to the outlet.

3. The assembly according to claim 2, wherein said supply pipe has a primary end and a secondary end, said supply pipe being elongated between said primary and secondary ends, said second end of said respective fluid fitting insertably receiving said primary end of said supply pipe wherein said supply pipe is configured to extend downwardly along a wall of a building through which the outlet of the sump pump protrudes, said secondary end of said supply pipe having one of said fluid fittings being associated therewith, said first end of said associated fluid fitting insertably receiving said secondary end of said supply pipe wherein said associated fluid fitting is configured to be aligned with the ground.

4. The assembly according to claim 3, wherein each of said drainage pipes has a first end, a second end and an outer wall extending therebetween, said outer wall of each of said drainage pipes having said holes extending into an interior of said drainage pipes, said holes on a respective one of said drainage pipes being distributed between said first and second ends of said respective drainage pipe, said holes on each of said drainage pipes being arranged into a plurality of rows on said drainage pipes, said holes on each of said drainage pipes being directed laterally away from said drainage pipe wherein said holes on each of said drainage pipes is configured to direct the water outwardly from said drainage pipes for irrigating plants on the ground when the sump pump is pumping the water.

5. The assembly according to claim 4, wherein each of said drainage pipes has a plurality of drain apertures each extending into said interior of said drainage pipes, said drain apertures on a respective one of said drainage pipes being distributed between said first and second ends of said respective drainage pipe, said drain apertures on said respective drainage pipe being offset from said holes on said respective drainage pipe, each of said drain apertures on said respective drainage pipe being directed downwardly wherein said drain apertures on said respective drainage pipe is configured to drain residual water from said drainage pipes when the sump pump is not pumping the water.

6. The assembly according to claim 4, Wherein each of said cleanout fittings has a primary end and a secondary end, said access port on each of said cleanout fittings being centrally positioned between said primary and secondary ends, said access port on each of said cleanout fittings being oriented to extend along a line being perpendicular to a line extending through said primary and secondary ends of said cleanout fittings, said access port on each of said cleanout fittings having a bounding surface.

7. The assembly according to claim 6, further comprising a plurality of caps, each of said caps being positionable in said access port of a respective one of said cleanout fittings to close said access port on said respective cleanout fitting, each of said caps having an outer surface, said outer surface of each of said caps being threaded, said outer surface of each of said caps threadably engaging said bounding surface of said access port on said respective cleanout fitting.

8. The assembly according to claim 4, further comprising an end cap being coupled to a respective one of said drainage pipes being distally positioned to said supply pipe for closing said respective drainage pipe, said end cap having a first end and a second end, said first end of said end cap insertably receiving said secondary end of said respective drainage pipe.

9. A sump pump irrigation assembly being configured to distribute water discharged from a sump pump over an area for reducing water erosion from the sump pump, said assembly comprising:
    a plurality of fluid fittings, a respective one of said fluid fittings being fluidly coupled to an outlet of a sump pump wherein said respective fluid fitting is configured to receive water from the outlet, each of said fluid fittings having a first end and a second end, each of said fluid fittings having a bend being centrally positioned between said first and second ends such that each of said fluid fittings forms an elbow, said first end of said respective fluid fitting being fluidly coupled to the outlet;
    a supply pipe being fluidly coupled to said fluid fitting that is fluidly coupled to the outlet wherein said supply pipe is configured to receive the water from said fluid fitting, said supply pipe having a primary end and a secondary end, said supply pipe being elongated between said primary and secondary ends, said second end of said respective fluid fitting insertably receiving said primary end of said supply pipe wherein said supply pipe is configured to extend downwardly along a wall of a building through which the outlet of the sump pump protrudes, said secondary end of said supply pipe having one of said fluid fittings being associated therewith, said first end of said associated fluid fitting insertably receiving said secondary end of said supply pipe wherein said associated fluid fitting is configured to be aligned with the ground;

a plurality of drainage pipes, each of said drainage pipes being in fluid communication with said supply pipe wherein each of said drainage pipes is configured to receive the water from said supply pipe, each of said drainage pipes having a plurality of holes therein wherein each of said holes in each of said drainage pipes is configured to release the water outwardly therefrom thereby facilitating the water to be distributed over a large area for reducing erosion on the ground, each of said drainage pipes having a first end, a second end and an outer wall extending therebetween, said outer wall of each of said drainage pipes having said holes extending into an interior of said drainage pipes, said holes on a respective one of said drainage pipes being distributed between said first and second ends of said respective drainage pipe, said holes on each of said drainage pipes being arranged into a plurality of rows on said drainage pipes, said holes on each of said drainage pipes being directed laterally away from said drainage pipe wherein said holes on each of said drainage pipes is configured to direct the water outwardly from said drainage pipes for irrigating plants on the ground when the sump pump is pumping the water, each of said drainage pipes having a plurality of drain apertures each extending into said interior of said drainage pipes, said drain apertures on a respective one of said drainage pipes being distributed between said first and second ends of said respective drainage pipe, said drain apertures on said respective drainage pipe being offset from said holes on said respective drainage pipe, each of said drain apertures on said respective drainage pipe being directed downwardly wherein said drain apertures on said respective drainage pipe is configured to drain residual water from said drainage pipes when the sump pump is not pumping the water;

a plurality of cleanout fittings, each of said cleanout fittings being fluidly coupled between a respective pair of said drainage pipes such that the respective pair of drainage pipes are linearly aligned thereby placing each of said drainage pipes in fluid communication with each other, each of said cleanout fittings having an access port being oriented perpendicular with said drainage pipes for accessing an interior of said cleanout fittings when said cleanout fittings are coupled to said drainage pipes wherein said access port on each of said cleanout fittings is configured to facilitate debris to be removed from said cleanout fittings, each of said cleanout fitting having a primary end and a secondary end, said access port on each of said cleanout fittings being centrally positioned between said primary and secondary ends, said access port on each of said cleanout fittings being oriented to extend along a line being perpendicular to a line extending through said primary and secondary ends of said cleanout fittings, said access port on each of said cleanout fittings having a bounding surface;

a plurality of caps, each of said caps being positionable in said access port of a respective one of said cleanout fittings to close said access port on said respective cleanout fitting, each of said caps having an outer surface, said outer surface of each of said caps being threaded, said outer surface of each of said caps threadably engaging said bounding surface of said access port on said respective cleanout fitting; and an end cap being coupled to a respective one of said drainage pipes being distally positioned to said supply pipe for closing said respective drainage pipe, said end cap having a first end and a second end, said first end of said end cap insertably receiving said secondary end of said respective drainage pipe.

10. The assembly according to claim 9, further comprising a receiver having a rectangular entry port wherein said rectangular entry port is configured to insertably receive a downspout on a gutter for receiving water from the downspout, said receiver having an outlet, said outlet insertably receiving said primary end of said supply pipe wherein said supply pipe is configured to receive the water from the downspout.

* * * * *